UNITED STATES PATENT OFFICE.

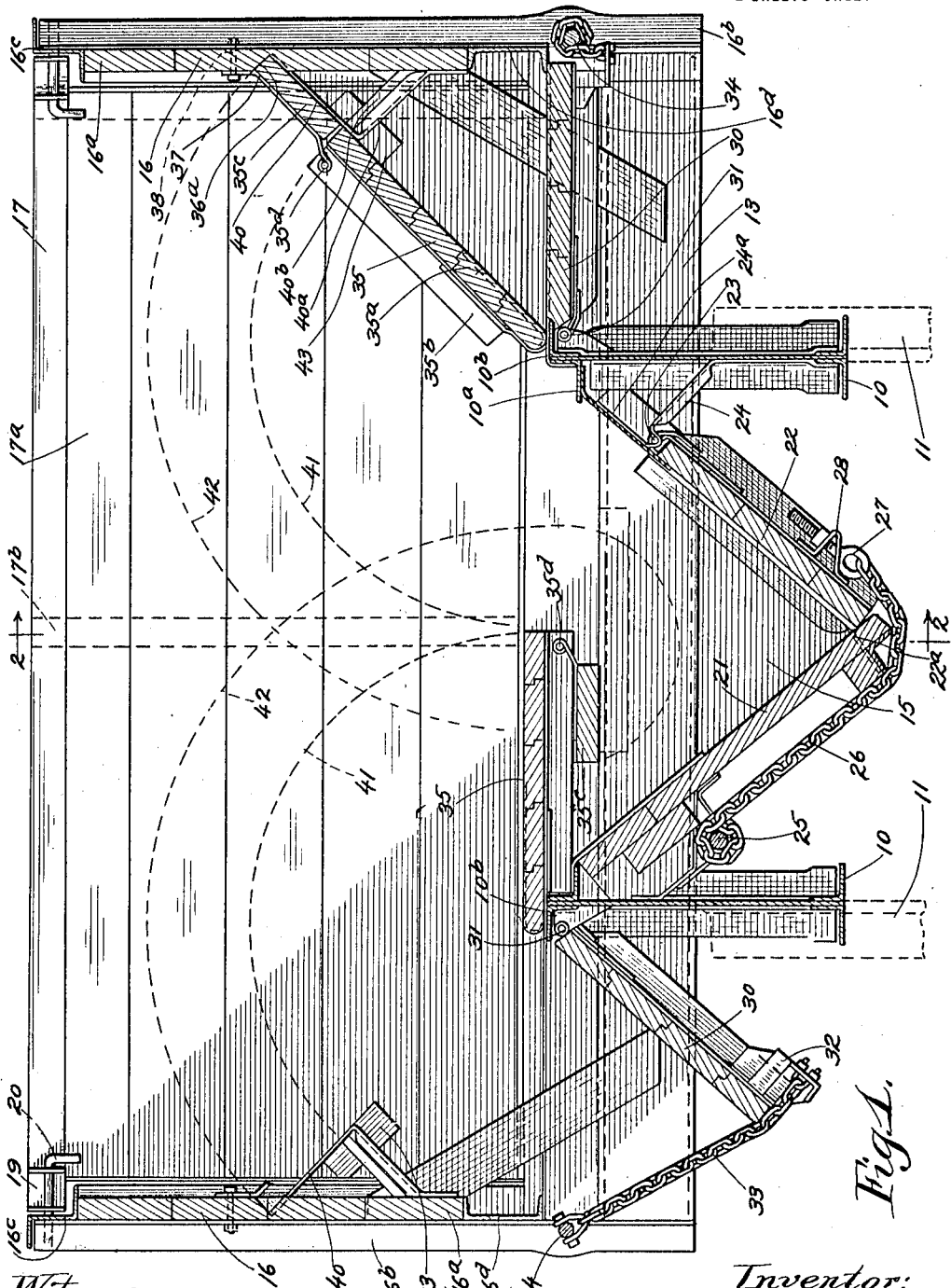

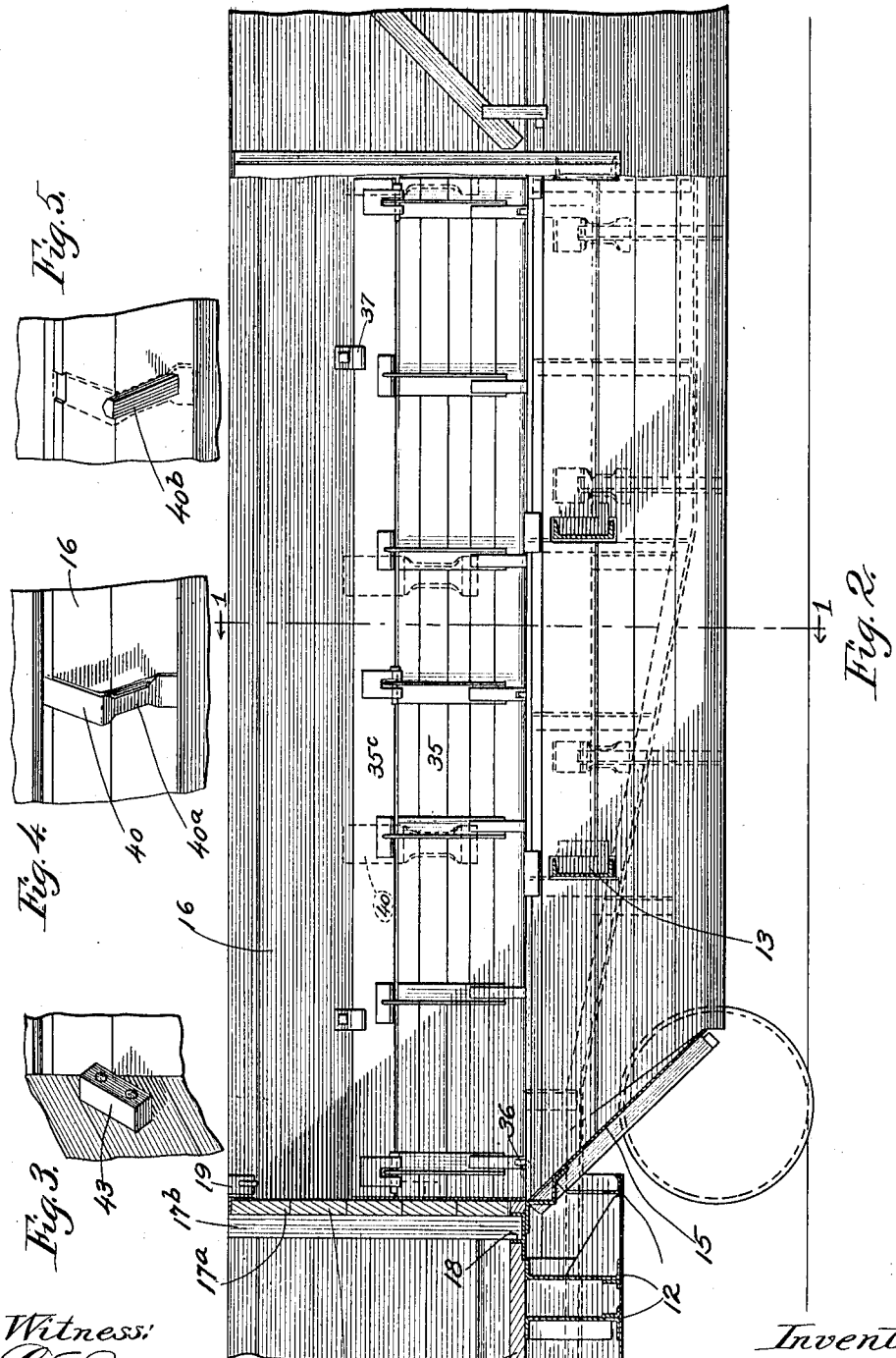

WILLIAM E. MOREY, OF CHICAGO, ILLINOIS, ASSIGNOR TO RODGER BALLAST CAR COMPANY, A CORPORATION OF MAINE.

CONVERTIBLE FREIGHT-CAR.

1,311,906.  Specification of Letters Patent.  Patented Aug. 5, 1919.

Application filed September 13, 1915. Serial No. 50,481.

*To all whom it may concern:*

Be it known that I, WILLIAM E. MOREY, a citizen of the United States, residing at Chicago, in the county of Cook and State of Illinois, have invented certain new and useful Improvements in Convertible Freight-Cars, of which the following is a specification.

This invention relates to freight cars, and in particular to that class of cars known as convertible freight cars.

The principal object of the invention is to provide a freight car so constructed that it may be readily converted from a hopper bottom car to a flat bottom or gondola car, or vice versa. My improved car comprises a plurality of dumping doors in combination with means for rendering a desired set of doors operative and another set inoperative, so that the contents of the car may be discharged between the rails of the track or at the sides of the track as desired. A further feature of the invention relates to the use of convertible doors which may be swung into position over either set of dumping doors so as to form a continuation of the hopper bottom in one position and a continuation of the flat bottom when in the other position. A further object of the invention is to provide a freight car having a set of downwardly converging, centrally discharging, dumping doors and a set of normally horizontal, laterally discharging, dumping doors, in combination with convertible doors which are hingedly mounted between the dumping doors of one set and the dumping doors of the other set, so that the said convertible doors may be inclined upwardly to form a continuation of the central, downwardly converging dumping doors or swung inwardly over the first named set of dumping doors to form a continuation of the laterally discharging horizontal dumping doors. A further feature of the invention relates to the improved construction of the convertible doors and the improved means for supporting the same in either of the positions above referred to.

These and other objects of the invention will be set forth more particularly in the following specification, taken in connection with the accompanying drawings, in which one embodiment of the invention is illustrated.

In the drawings—

Figure 1 shows a transverse vertical section through my improved car taken substantially on the line 1—1 of Fig. 2;

Fig. 2 is a partial longitudinal vertical section through a half length of the car taken substantially on the line 2—2 of Fig. 1, showing a partial side elevation of the remainder of the car;

Fig. 3 is a perspective view on one corner of the car showing a support for a convertible door;

Fig. 4 is a perspective view of a support for a convertible door, employed intermediately of the ends of the car; and Fig. 5 is a view similar to Fig. 4, with the metallic bracket shown by dotted lines and the filler block or post by full lines.

The embodiment of my invention now to be described is illustrated in the drawings in connection with a portion only of a car, since both ends of the car are alike, and it comprises two longitudinally extending center sills 10, which in this instance are of built-up steel construction. These center sills are spaced apart a distance substantially equal to the distance between the car wheels, which are designated by the numeral 11. The car frame-work also comprises the transverse beams 12 adjacent the ends of the car and the transverse sills 13 of channel form between the end portions of the car. All of these parts of framework are rigidly secured by any suitable means, forming no part of the present invention. The transverse beams 12 support the floor planks 14 at the ends of the car, and inclined inwardly from the floor planks 14 toward the middle portion of the car are the metallic inclined floor sections 15, which form a part of the central hopper bottom. The side walls 16 of the car are built up from side planks 16$^a$ suitably secured to the side stakes 16$^b$, which are carried by the car frame-work. Z-bars 16$^c$ are secured along the upper edges of the side walls and channel beams 16$^d$ extend along the lower edges thereof. The end walls 17 are formed of suitable end planks 17$^a$ secured to the end stakes 17$^b$, which are adapted to enter pockets 18 formed in the car flooring 14. The upper plank of each end wall 17 carries a bracket 19 at each end thereof which projects into the channels formed by the Z-bars 16$^c$, and the bolts 20 passing through these brackets and the Z-bars of the adjacent side walls 16 serve to secure the end walls in position. As shown in Fig. 2, the end wall 17 is secured in position adjacent the upper extremity of the downwardly inclined floor section 15, which position it occupies when the car is being used as a hopper bottom car. When the car is being used as a flat bottom car, or at other times if desired, the end wall 17 may be secured in other positions approximately at the ends of the car.

Between the center sills 10 and extending longitudinally of the car between the inclined floor sections 15 is the inclined floor 21, which is secured at its upper part to the adjacent center sill 10 and which is inclined downwardly, terminating substantially beneath the longitudinal center line of the car. A downwardly inclined dumping door 22 is disposed opposite to the inclined floor 21 and converges therewith, the lower extremity 22$^a$ of the dumping door being adapted to engage the upper surface of the floor section 21 along the edge thereof when the dumping door is in closed position. The dumping door 22 is hinged at 23 to a suitable bracket 24 carried by the adjacent center sill 10 and the upper edge of the door engages the inclined plate 24$^a$ carried by said center sill. For the purpose of operating the dumping door 22, I provide a rod 25 extending longitudinally of the car adjacent the under side of the floor section 21 and connected to this rod is a chain 26 which passes downwardly along the under side of the floor section 21 and around the meeting edges of the floor section and dumping door, being secured at its extremity by means of the eye-bolt 27 to the bracket 28 secured to the underside of the dumping door. The rod 25 may be rotated by a pawl and ratchet mechanism or other suitable operating device located at the end of the car, which forms no part of this invention and which is therefore not shown in the drawings.

Extending outwardly from each center sill 10 is a laterally discharging dumping door 30, each of which doors is hinged at the points 31 to the adjacent center sill 10. These dumping doors normally occupy a horizontal position and engage along their outer edges the lower extremities of the side walls 16. Suitable brackets 32 are secured to these dumping doors and chains 33 connect the brackets 32 with the longitudinally extending rods 34 of suitable door operating mechanism. By rotating the rods 34 it will be apparent that the doors 30 may be raised or lowered as desired in order to discharge the contents of the car at the sides of the railway track.

For the purpose of rendering either set of dumping doors inoperative and for converting the freight car from a flat bottom car to a hopper bottom car or vice versa as desired, I have provided a plurality of convertible doors 35, which are built up of suitable planks 35$^a$ secured to the frame members 35$^b$. These doors are hingedly mounted on the center sills 10 at the points 36 and are adapted to be swung into the upwardly inclined position shown at the right in Fig. 1 or into the inwardly directed horizontal position shown at the left in Fig. 1. Each of the convertible doors 35 comprises a main or body portion and a lateral extension 35$^c$, which is hingedly connected to the frame members 35$^b$ by hinges 35$^d$. When the dumping door is in the upwardly inclined position as shown at the right of Fig. 1, the hinged extension 35$^c$ lies in the same plane with and forms a continuation of the body portion of the door, the outer edge of the extension 35$^c$ engaging and fitting within a longitudinally extending notch 36$^a$ formed in the side wall of the car. Suitable locking plates 37, pivoted to the side walls by pins 38, are adapted to swing over the extensions 35$^c$ of the convertible doors and secure the same in position. The extensions 35$^c$, and also the outer extremities of the body portions of the convertible doors, are supported by brackets 40 secured to the side walls 16. These brackets comprise the metallic portions 40$^a$ and the wooden filler blocks or posts 40$^b$, which are secured within the oppositely disposed flanges of the metallic brackets and which are provided with convex upper surfaces adapted to deflect gravel or other material therefrom so that such material will not collect on the brackets and alter the light weight of the car.

When the convertible doors 35 are swung inwardly to the horizontal position, as illustrated at the left of Fig. 1, the extensions 35$^c$ are adapted to swing about the hinges 35$^d$ to assume a position beneath the body portions of the dumping doors, as clearly illustrated in Fig. 1, in which position the extensions 35$^c$ rest upon the transverse sills 13 and thus support the body portions of the convertible doors in a horizontal position. When in this position the ends of the members 35$^b$ rest in the longitudinal notches formed by the angle bars 10$^a$ carried by the center sills. The oppositely disposed angle bars 10$^b$ of the center sills are arranged in positions the reverse of those occupied by the angle bars 10$^a$ and said angle bars 10$^b$ are adapted to engage the inner edges of the dumping doors 30. It will be observed that when both of the oppositely disposed convertible doors are swung inwardly, the meeting edges of the body portions thereof will substantially engage each other, the paths of the edges of the body portion of the door and of the extensions thereof being illustrated by the dotted lines 41 and 42. The inner sides of the end walls 17 of the car are provided with blocks 43, which are secured thereto in an inclined position so that the upper surfaces thereof will lie in the same plane as the upper surfaces of the brackets 40, so as to support the extreme ends of the convertible doors when the latter occupy the upwardly and outwardly inclined positions.

From the foregoing description it will be apparent that when the convertible doors 35 are swung inwardly and supported in horizontal position by means of the extensions 35ᶜ thereof resting on the transverse sills 13, the downwardly inclined centrally discharging dumping doors 22 will be rendered inoperative and the convertible doors 35 will form a flat bottom which is substantially a continuation of the flat bottom formed by the laterally discharging dumping doors 30. When the convertible doors are adjusted as just described, the freight car may be used as a flat bottom, laterally discharging car and the contents thereof may be discharged at the sides of the track by manipulating the door operating mechanism 33—34 so as to lower the dumping doors 30 into the downwardly and outwardly inclined positions illustrated, for instance, at the left of Fig. 1. When the convertible doors 35 are swung into the upwardly and outwardly inclined position as shown at the right of Fig. 1, said doors and the continuations 35ᶜ thereof will lie in substantially the same planes as the dumping doors 22 and the inclined floor sections 21, so that a hopper bottom will be formed extending between the side walls of the car. When the convertible doors are in this position, the contents of the car are discharged by operating the mechanism 25—26, in order to manipulate the dumping door 22.

It will be seen that I have provided an improved form of freight car construction, whereby the objects of the invention as previously outlined are attained in a convenient and efficient manner, so that a single car may be put to a variety of uses merely by manipulating the convertible doors so as to adapt the car to the purposes desired.

Although I have shown and described a particular embodiment of the invention, it will be understood that the principles thereof may be embodied in various other forms of construction without departing from the scope of the invention as defined in the appended claims.

What I claim is:

1. In a freight car, a longitudinal sill located inwardly from the side of the car, and a convertible door having an extension hinged thereto, said door being hinged along said sill and movable to positions on either side of said sill.

2. In a freight car, a central longitudinal hopper adapted to discharge between the rails of a railway track, side dumping doors on each side of said central hopper adapted to discharge at the sides of said track, and convertible doors hinged between said central hopper and each of said side dumping doors, said convertible doors being adapted to assume positions above said side dumping doors and to be moved inwardly toward each other to horizontal positions above said central hopper with their upper surfaces lying substantially in one plane.

3. In a freight car, a central longitudinal hopper adapted to discharge between the rails of a railway track, side dumping doors adapted to discharge at the sides of said track, and convertible doors adapted to swing inwardly over said central hopper with their edges meeting to form a horizontal floor above said central hopper, said convertible doors having extensions adapted to form continuations thereof when said convertible doors are swung to outwardly and upwardly inclined positions above said side dumping doors.

4. In a freight car, a dumping door adapted to discharge between the rails of a railway track, a second dumping door adapted to discharge adjacent the side of said track, and a convertible door adapted to be moved into position above either of said dumping doors to render the same inoperative, said convertible door being formed in two parts one arranged to form a continuation of the other in one position and to support said other part in another position of the convertible door.

5. In a freight car, a longitudinal sill located substantially above the wheels of the car, a transverse sill, a convertible door hinged along said longitudinal sill and adapted to be swung to positions on either side of said longitudinal sill, said convertible door having an extension adapted to form a continuation thereof when said convertible door is in a position at one side of said sill, said extension being adapted to rest upon said transverse sill and support said convertible door when the latter is at the other side of said longitudinal sill.

6. In a freight car, a dumping door adapted to discharge between the rails of a railway track, a second dumping door adapted to discharge at the side of said track, and a convertible door hinged between said dumping doors and movable to a position over either of them, said convertible door comprising two parts one adapted to form a continuation of the other in one position of the convertible door and to lie beneath and support said other part in the other position of the convertible door.

7. In a freight car having a hopper bottom, a downwardly inclined dumping door forming a part of said bottom and adapted to discharge between the rails of a railway track, a second dumping door adapted to discharge at the side of said track, and a convertible door hinged between said dumping doors and adapted to assume a horizontal position over said first named door and to be swung into an upwardly and outwardly inclined position over said second named dumping door, said convertible door having a removable extension connected thereto.

8. In a freight car, a center sill, a transverse sill, a downwardly inclined dumping door, a convertible door hingedly supported on said center sill and adapted to swing over said dumping door, a part of said convertible door being arranged to swing under the other part thereof and rest on said transverse sill to support the other part of said convertible door above the same.

9. In a freight car, a door hinged on the bottom of the car and inclined upwardly therefrom, said door being formed in a section and an extension hinged thereto, and means for supporting said sections at their meeting edges.

10. In a freight car, a door hinged along the bottom of the car and inclined upwardly therefrom to the side wall of the car, said door being formed in a section and an extension hinged thereto longitudinally of the car, and means carried by the side wall of the car for supporting both sections of said door.

11. In a freight car, a door hinged along the bottom of the car and inclined upwardly therefrom to the side wall of the car, said door being formed in a section and an extension hinged thereto longitudinally of the car, and brackets secured to the side wall of the car for supporting both sections of said door.

12. In a freight car, a door hinged along the bottom of the car and inclined upwardly therefrom to the side wall of the car, said door being formed in a section and an extension hinged thereto longitudinally of the car, and brackets secured to the side wall of the car for supporting the section and extension of said door, said brackets being formed to prevent collection of finely divided materials on the same.

13. In a freight car, a door hinged along the bottom of the car and inclined upwardly therefrom to the side wall of the car, said door being formed in a section and an extension hinged thereto longitudinally of the car, and means carried by the side wall of the car for supporting the section and extension of said door, the side wall of the car being notched to receive the upper edge of said door.

14. In a freight car, a door hinged along the bottom of the car and inclined upwardly therefrom to the side wall of the car, said door being formed in sections hinged longitudinally of the car, and means carried by the side wall of the car for supporting both sections of said door, the side wall of the car being notched to receive the upper edge of said door, and fastening means for securing said convertible door in position with respect to said supporting means.

15. In a freight car, a center sill and a door hinged on said sill and arranged to assume positions at either side of said sill, said sill comprising an angle bar extending longitudinally of the upper part thereof to form a seat in the angle thereof for a part of said door when the latter is in one of said positions.

16. In a freight car, a pair of center sills, a transverse sill, a dumping door hinged on an axis longitudinally of the car and adapted to discharge between said center sills, a second dumping door hinged along one of said center sills and arranged to discharge outwardly at the side thereof, a convertible door hinged between said dumping doors and arranged to swing over either of the latter, a part of said convertible door being hinged to swing under the body portion thereof and to rest on said transverse sill when the convertible door is in position over said first-named door.

In testimony whereof I have subscribed my name.

WILLIAM E. MOREY.

Copies of this patent may be obtained for five cents each, by addressing the "Commissioner of Patents, Washington, D. C."